United States Patent [19]
Ochiai

[11] 3,762,775
[45] Oct. 2, 1973

[54] SKID CONTROL APPARATUS
[75] Inventor: Takeshi Ochiai, Toyota-shi, Aichi-ken, Japan
[73] Assignee: Toyota Jidosha Kogyo Kabushiki Kaisha, Aichi-ken, Japan
[22] Filed: July 21, 1971
[21] Appl. No.: 164,672

[30] Foreign Application Priority Data
July 24, 1970 Japan............................ 45/64381

[52] U.S. Cl. ............. 303/21 P, 188/181 C, 303/20, 303/21 BE, 303/21 A
[51] Int. Cl................................................ B60t 8/10
[58] Field of Search.............. 188/181 C; 244/111; 303/20, 21; 317/5; 318/52; 324/160-161; 340/263

[56] References Cited
UNITED STATES PATENTS

| | | | |
|---|---|---|---|
| 3,131,975 | 5/1964 | Smith et al. ..................... | 303/21 P |
| 3,362,757 | 1/1968 | Marcheron ...................... | 303/21 P |
| 3,614,172 | 10/1971 | Riordan .......................... | 303/21 BE |
| 3,622,208 | 11/1971 | Krugler, Jr. ................. | 188/181 C X |
| 3,650,575 | 3/1972 | Okamoto ..................... | 188/181 C X |

Primary Examiner—Milton Buchler
Assistant Examiner—Stephen G. Kunin
Attorney—David Toren et al.

[57] ABSTRACT

In the skid control apparatus disclosed a wheel velocity detector detects the velocity of a wheel on a vehicle that is being slowed down by application of a brake. A braking pressure detector detects the pressure created in a brake fluid in a brake line passing from a master cylinder to a brake cylinder. A control circuit establishes a predetermined or set wheel velocity from the vehicle's deceleration, the vehicle velocity, the rate at which the braking fluid pressure is increased, the gradient of the characteristic curve representing the relationship between the coefficient of friction of the road surface on which the vehicle travels and the wheel slip ratio. The control circuit then compares the set wheel velocity and the actually measured wheel velocity. When the actual wheel velocity is lower than the set wheel velocity, thereby indicating that the deceleration of the wheel has been more rapid than the set or desired deceleration, the control circuit issues a signal indicating excessive deceleration. A pressure regulator responds to this signal by decreasing the pressure of the braking fluid in accordance with this signal of the control circuit.

29 Claims, 13 Drawing Figures

PATENTED OCT 2 1973  3,762,775

INVENTOR:
TAKESHI OCHIAI

By Toren and McGeady
Attorneys

SKID CONTROL APPARATUS

REFERENCES TO COPENDING APPLICATIONS

This application is related to the following copending applications. The disclosures in all of these applications are hereby made a part of this application as if fully recited herein:

Applications of Takeshi Ochiai, Ser. No. 109,461 filed Jan. 25, 1971, entitled SKID CONTROL SYSTEM FOR VEHICLES, and Ser. No. 109,465 filed Jan. 25, 1971 entitled SKID CONTROL SYSTEM, both now abandoned in favor of Continuation-in-Part Applications Ser. No. 270,584, entitled SKID CONTROL SYSTEM FOR VEHICLES, and all assigned to the same assignee as this application;

Application of Hiroshi Arai et al., Ser. No. 137,858, filed Apr. 27, 1971, entitled VEHICLE BRAKE SYSTEMS USING SKID CONTROL DEVICES, and assigned to the same assignee as this application, now abandoned and pending as Divisional Application Ser. No. 162, 405 filed Jan. 5, 1973, filed July 14, 1971.

BACKGROUND OF THE INVENTION

This invention relates to skid control systems for preventing the wheels of a vehicle from locking and skidding in response to excessive brake pressure, and particularly to such systems incorporating devices for establishing a predetermined desired deceleration. The invention relates more generally to vehicle brake systems, vehicles themselves, and methods for skid control in such brake systems.

Such skid control systems may be used, for example, with automobiles. In such systems a pressure regulator reduces or relieves the pressure applied by the vehicle's master cylinder when a controller detects the fact that the wheel velocity, as measured by a wheel sensor is decreasing faster than a safe deceleration. Several embodiments of such systems are disclosed in the beforementioned copending applications.

In general such systems attempt to bring a vehicle to a halt within a minimum braking distance without causing loss of control or spinning of the vehicle body due to wheel lock. The attempt is to regulate the pressure to the brake on the wheel to produce the above effects regardless of the physical effort applied to the brake pedal when an operator attempts to stop the vehicle, such as in an emergency.

Such skid control systems rely upon a factor known as the wheel slip ratio, namely the fractional departure of the wheel velocity from the vehicle velocity. Recognizing that the maximum coefficient of friction between a wheel and a road surface during braking occurs when the wheel slip ratio is in the range of from 0.15 to 0.2, such skid control systems regulate the wheel slip ratio so as to remain at a constant value by picking an arbitrary value within that range of wheel slip ratios and setting it. Consequently, skid control produced according to such systems relies upon this constant value. Therefore, optimum skid control cannot be obtained if the wheel slip ratio at which the coefficient of friction is maximum changes due to changes in the character of the road surface, vehicle velocity, shape of the tire, or other factors. Thus, such skid control devices leave much to be desired.

An object of this invention is to improve skid control systems and methods.

Another object of this invention is to obviate the disadvantages of former skid control systems.

Still another object of this invention is to bring vehicles to halt while the coefficient of friction between the road surface and the wheel is at a maximum, regardless of whether the road surface, vehicle velocity or other factors are changed. Still another object of the invention is to insure optimum skid control where a wheel is likely to lock.

SUMMARY OF THE INVENTION

According to a feature of the invention these objects are obtained in a skid control apparatus wherein regulator means relieve the braking force applied by a brake applicator to a wheel brake by establishing a set deceleration. The set deceleration is established by the sum of one value corresponding to the brake pressure and a second value proportional to the product of the initial coefficient-of-friction wheel-slip-ratio curve and the differential value of the brake pressure as well as the vehicle velocity. Control means cause the regulator means to relieve the braking force supplied by a brake applicator to a wheel brake when the control means detects that the wheel velocity declines at a rate exceeding the set deceleration.

According to another feature of the invention a comparator determines whether the wheel velocity declines at a rate exceeding the safe set rate by comparing the instantaneous wheel velocity with the wheel velocity that existed when braking was initiated diminished by a time integral of the set deceleration over the time since braking had been initiated. This compares the instantaneous wheel velocity with the velocity that would exist had the set deceleration been prevelant since initiation of braking. If the instantaneous velocity is lower, thereby indicating excessive deceleration, a pressure relieving signal is applied to the regulator.

According to a more general feature of the invention a continuously changing set velocity subsequent to the initiation of braking is established. The instantaneous velocity is then compared with the set velocity.

According to another feature of the invention the velocity at initiation of braking is established as an electrical value which is diminished by a constant current corresponding to the brake pressure and a declining current.

These and other features of the invention are pointed out in the claims. Other objects and advantages of the invention will become obvious from the following detailed description when read in light of the accompanying drawings.

BRIEF DESCRIPTION OF THE DRAWINGS

FIG. 11b is a graph illustrating the deceleration of the wheel in FIG. 1 for the variation illustrated in FIG. 11a.

DETAILED DESCRIPTION OF PREFERRED EMBODIMENTS

The following description is made with respect to an automobile brake system, but may be applicable to brake systems of other vehicles and is not limited to the automobile.

Figure 1:
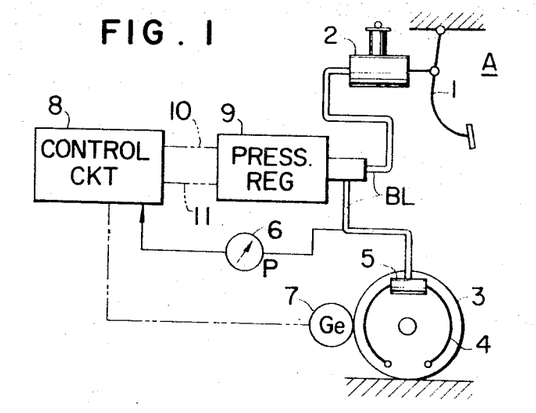
FIG. 1 is a schematic drawing illustrating a brake arrangement with a skid control apparatus each embodying features of the invention.

In FIG. 1 a brake pedal 1 of automobile A embodying features of the invention actuates a master cylinder 2. The brake pedal 1 and the master cylinder 2 serve to control rotation of a wheel 3 forming part of the automobile by means of a brake shoe 4 and a wheel cylinder 5. The latter receives brake fluid under pressure from the master cylinder 2 through a brake line or hydraulic pressure line BL. A pressure detector 6 on the hydraulic pressure line and forming part of the automobile A detects the brake pressure in the wheel cylinder 5. A velocity detector or generator 7 detects the rotational speed of the wheel in the vicinity of the wheel 3. A control circuit responds to the electrical signals from the detector 7. The control circuit 8 also forming part of the automobile A and this invention elecrically regulates a pressure regulator 9 through electrical lines 10 and 11. The pressure regulator 9 intervenes between the master cylinder 2 and the wheel cylinder 50 so as to control the pressure in the wheel cylinder and set it at an optimum value.

Under normal travel conditions, when the skid control system forming a part of the brake system is not required to operate, the pressure of brake fluid supplied to the master cylinder 2 conforms to the amount of physical effort applied to the brake pedal 1. This pressure is applied without change to the wheel cylinder 5 so as to produce a corresponding braking force. This decelerates the rotational speed of the wheel 3. The pressure detector 6 senses this braking pressure being applied to the wheel cylinder 5.

When emergency braking is applied on the pedal 1 there is danger that the wheel 3 may lock due to depletion of the frictional force between the wheel and the road surface. If such a danger exists the control circuit 8 then responds to the wheel velocity detected by the wheel velocity detector 7 to issue a pressure reduction signal. By means of the latter the pressure regulator 9 shuts off or reduces the flow of brake fluid from the master cylinder 2. It then regulates the pressure of the fluid in the wheel cylinder 5. By preventing the wheels from locking in this manner, the vehicle is brought to a halt within a minimum stopping distance.

Figure 2:
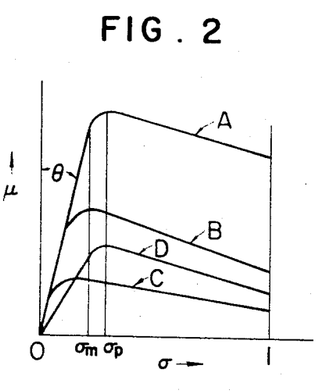
FIG. 2 is a graph illustrating various characteristics of coefficients of friction for wheel slip ratios in vehicles, such as those in FIG. 1.

In FIG. 2 changes in various coefficients of friction $\mu$ of wheels, such as the wheel 3, are plotted along the ordinate of the rectangular coordinates, while the wheel slip ratio $\sigma$ is plotted along the abscissa. The wheel slip ratio is defined as the fractional change in wheel velocity as compared to the vehicle velocity, namely $(v-w)/v$, where $v$ represents the vehicle velocity and $w$ the wheel velocity. Thus FIG. 2 illustrates $\mu-\sigma$ curves that vary in ways depending upon road surface conditions or vehicle speed or both. Generally it has been determined that the part of curves between the point where the wheel slip ratio $\sigma$ is zero and the point where the $\mu-\sigma$ curve is curved, that is in the vicinity of the point where $\mu$ is maximum, or the knee of the curve, proceed along a straight line having a constant gradient $d\sigma/d\mu$ at an angle $\theta$ as shown in curves A, B and C. There are some variation depending on the conditions of the road surfaces. A curve such as the curve D is sometimes detected. Nevertheless generally the curves proceed in a straight line from zero to the knee of the curves along the constant gradient $d\sigma/d\mu$. Although the variations exist it can safely be assumed that the gradient of all these curves is substantially constant.

Figure 3:
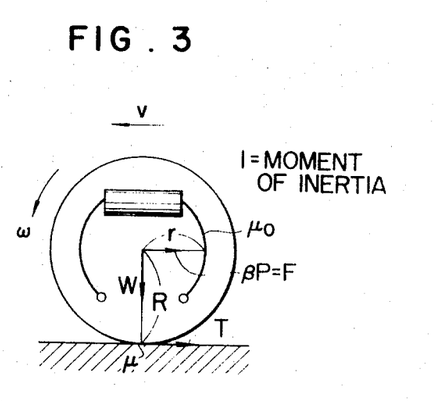
FIG. 3 is a schematic drawing of the wheel in FIG. 1 showing various characteristics of the wheel and its brake.

FIG. 3 illustrates schematically a number of dimensions for analyzing the opeation of the wheel 3 as it and the vehicle travel and brakes are applied. FIG. 2 illustrates the vehicle velocity $v$, the wheel velocity $w$, and the force $\beta P=F$ between the brake shoe and the drum. The value P represents the pressure between the brake shoe and the drum or the pressure of the brake fluid, the latter being proportional to the former, while $\beta$ is a constant which may, for example, represent the area of contact between the brake shoe and the drum.

FIG. 3 also illustrates the effective radius R of the wheel 3, the radius $r$ of the brake drum, the coefficient of friction $\mu_0$ between the brake shoe and the drum, the coefficient of friction between the road surface and the wheel $\mu$, and the braking torque T.

In discussing these dimensions reference will be made to the deceleration G of the wheel 3, the gradient $\sigma/\mu = \tan\theta$ of the $\mu-\sigma$ curve, the moment of inertia I of the wheel, the time $t$, and the gravitational acceleration $g$.

Figure 4:
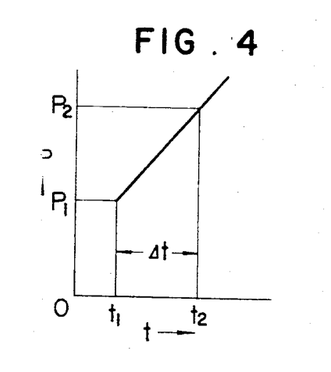
FIG. 4 is a graph illustrating changes in the pressure applied to the wheel cylinder of the wheel in FIG. 1 by operation of the brake pedal in FIG. 1 over a specified time period.
Figure 5:
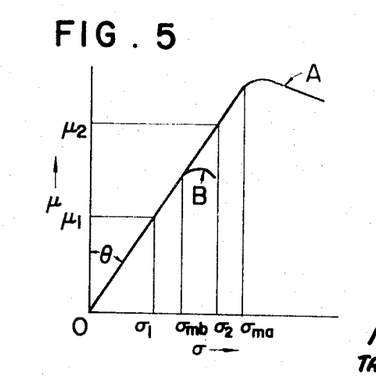
FIG. 5 is a graph illustrating changes in coefficients of friction for various wheel slip ratios under different conditions.

FIG. 4 illustrates the relationship between the pressure P of the brake fluid in the wheel cylinder 5 at different times $t$. FIG. 5 shows the $\mu-\sigma$ curves under two different road conditions which are respectively represented by the curves A and B.

Figure 6:
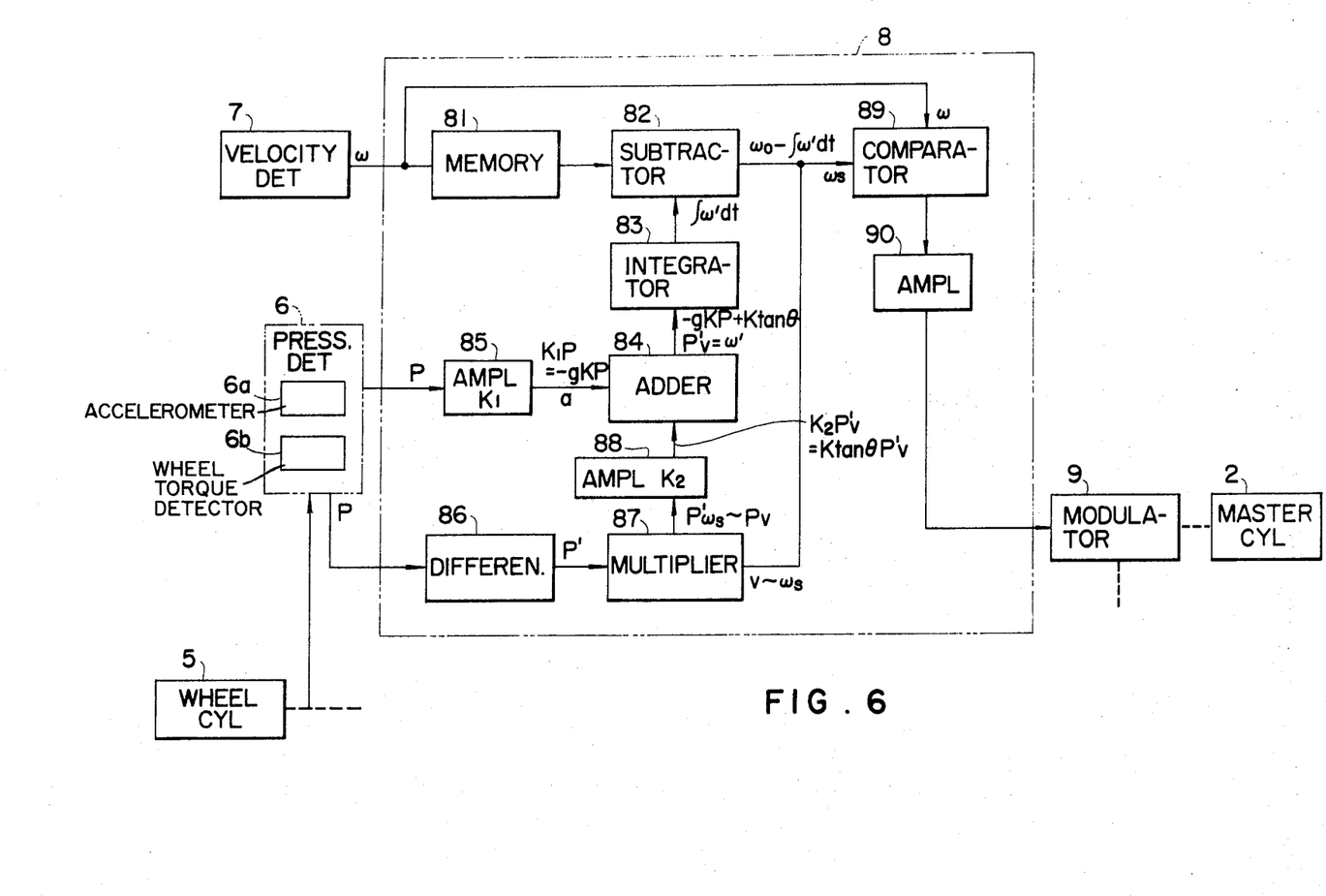
FIG. 6 is a block diagram of a system forming a portion of FIG. 1 and embodying features of the invention.

The relationships between these various factors are duscussed with reference to FIGS. 1 and 6 wherein the latter illustrates an emboidment of the control circuit 8 and its connections to the pressure regulator 9 and the velocity detector 7 as well as the pressure detector 6. In FIGS. 1 and 6 the pressure detector 6 responds to the hydraulic pressure in the wheel cylinder 5 by generating a signal P corresponding to the pressure in the brake line or wheel cylinder. At the same time the wheel velocity detector 7 furnishes a signal corresponding to the wheel velocity $w$. Both the signals at the output of the pressure detector 6 and the wheel velocity detector 7 are passed to the control circuit 8 to perform its skid controlling function. Thus the control signal from the control circuit 8 is transmitted to the pressure modulator 9.

In FIG. 6 the output signal of w of the wheel velocity detector 7 passes to an initial velocity memory circuit 81 as well as a comparator 89. The initial velocity memory circuit 81 memorizes the wheel velocity $w_0$ at the time when braking is started. It thus maintains this velocity as its output. In general the memory circuit detects the sudden decrease in wheel velocity that occurs when the brakes are applied and memorizes this value. On the other hand the hydraulic pressure P in the wheel cylinder 5 which is detected by the pressure detector 6 is passed to a linear amplifier 85. The latter produces a signal $a$ whose value is equal to $K_1P$ or $-gKP$. The values $K_1$ and K are constants which include the constant $\beta$.

A differentiator 86 differentiates the pressure P to obtain the so-called pressure speed P' or the rate of change of pressure. A multiplier 87 produces the product of the pressure speed and the vehicle velocity $v$. According to this embodiment of the invention the vehicle velocity $v$ is determined for slip ratios less than 0.2. Under these circumstances the set wheel velocity $w_s$, which is produced within the circuit 8 and which represents the desired safe wheel velocity at any time, equals $v$. The output of the multiplier 87 is thus equal to $P'w_s = P'v$.

A linear amplifier 88 multiplies the value at the output of the multiplier 87 to a value $K_2P'v$. Here again the constant $K_2$ includes the constant $\beta$ which represents the proportion between the pressure P and the force F between the brake shoe and the drum. The output of the amplifier 88 thus produces a signal $\epsilon$ equal to $K_2P'v=K\tan\theta \ P'v$, where K is a constant including the value. An adder 84 adds the values of the signal $a$ and $\epsilon$ which together equal $-gKP+K$ tangent $\tan\theta P'v$. This sum represents the set wheel deceleration $w'$ which corresponds to the desired safe deceleration. An integrator 83 integrates the deceleration $w'$ with respect to time. A subtractor 82 then subtracts the value $\int w'dt$ from the initial velocity $w_0$ memorized by the memory circuit 81. The result, $w_s = w_0 - \int w'dt$ represents the set wheel velocity $w_s$ which represents the velocity that a wheel should exhibit at any time so as to be decelerated without locking within the range of a slip ratio smaller than that at which the coefficient or friction is maximum.

The comparator 89 compares the set wheel velocity $w_s$ with the instantaneous wheel velocity $w$ to derive a pressure reducing signal when the actual wheel velocity $w$ is lower than the set wheel velocity $w_s$. This signal is amplified by an amplifier 90 and serves to actuate the pressure regulator 9 to decrease the hydraulic pressure in the wheel cylinder 5. In other words, when the wheel is decelerated at a speed higher than the theoretical deceleration, that is when the slip ratio exceeds the maximum coefficient of friction and the wheel is about to lock the comparator 89 produces an output signal. Generally the pressure modulator 9 is actuated by means of an electromagnetic valve with a light. Where the velocity $w$ is greater than the set wheel velocity $w_s$ the comparator 89 produces no output. The regulator 9 thus allows the master cylinder 2 to apply full brake pressure to the wheel cylinder 5. No decrease in the pressure is produced. In other words, where the wheel is deceleraed at a rate lower than the theoretical safe deceleration no change in deceleration is necessary.

The control circuit 8 thus calculates the deceleration $w'$ to be developed when the wheel 3 is decelerated in the range of slip ratios from zero to the slip ratio at which the coefficient of friction is maximum. On the basis of the wheel velocity $w_0$ when braking is initiated and the deceleration $w'$, the control circuit 8 also calculates the set wheel deceleration $w_s=W_0- \int w'dt$. This set wheel deceleration is the intantaneous deceleration at which the wheel 3 is safely decelerated without locking and with a slip ratio less than at which the coefficient of friction $\mu$ is at a maximum. The control circuit 8 then compares the set wheel velocity $w_s$ and the actual wheel velocity $w$ at that moment and applies a signal for decreasing the hydraulic pressure in the wheel cylinder 5 to the pressure modulator 9 when the actual velocity $w$ is smaller than the set wheel velocity $w_s$. That the control circuit 8 as illustrated in FIG. 6 actually produces signals only when the deceleration exceeds the optimum deceleration regardless of various road conditions can be demonstrated from the ordinary equations of motion of a wheel at the time the brakes are applied. These equations utilize the beforementioned symbols illustrated in FIGS. 2 through 5. In general the symbols represent the following:

$v$ = vehicle velocity
$w$ = wheel velocity
P = pressure of the braking fluid
F or $\beta P$ = force between brake shoe and the drum of FIGS. 3 and 5.
R = effective radius of the wheel 3
$r$ = radius of the brake drum 4
$\mu_0$ = coefficient of friction between brake shoe and drum.
$\mu$ = coefficient of friction between the road surface and wheel 3.
T = the braking torque
G = wheel deceleration
$\tan\theta = \Delta\sigma/\Delta\mu$ the gradient of the $\mu$-$\sigma$ curve
$I$ = moment of inertia of the wheel 3
$t$ = time
$g$ = gravitational acceleration Of the following equations the first expresses the relation that the moment of inertia of the wheel multiplied by its rotational acceleration is equal to the net torque. The second equation expresses the relation that acceleration is equal to minus deceleration. The third equation defines the wheel slip ratio. The fourth equation defines $\tan\theta$ at the knee of the curves in FIG. 1. The fifth equation defines the torque imposed by the braking force on the wheel.

$$I (dw/dt) = R \mu W - 2r\mu_0\beta P \tag{1}$$

$$(dv/dt) = -g \mu (= -G) \tag{2}$$

$$\sigma = (v - w)/(v) \tag{3}$$

$$\tan \theta = \sigma/\mu \ (\text{wherein}, \lambda \leq \sigma \leq \sigma_m) \tag{4}$$

$$T = r\mu_0 \beta P \quad (5)$$

In equation 4, $\sigma_P$ represents the wheel slip ratio where the $\mu$–$\sigma$ graph starts to curve as is shown in FIG. 2.

We can assume that the pressure $P_1$ of a brake fluid being applied at the time $P_1$ increases linearly to $P_2$ at the time $t_2$ after an elapse of time $\Delta t$ as shown in FIG. 4. We also assume that the vehicle velocity simultaneously decreases and the wheel slip ratio $\sigma$ changes from $\sigma_1$ to $\sigma_2$ as illustrated in FIG. 5. If we substitute these conditions in equation number of 3 then $$w_1 = (1 - \sigma_1)v_1 \quad (6)$$

$$w_2 = (1 - \sigma_2)v_2 \quad (7)$$

If we subtract equation 6 from equation 7 to obtain the difference between them the following results $$w_2 - w_1 = (1 - \sigma_2)v_2 - (1 - \sigma_1)v_1$$
$$= (1 - [\sigma_1 + \sigma_2/2])(v_2 - v_1) - (\sigma_2 - \sigma_1)[v_1 + v_2/2] \quad (8)$$

By eliminating $\mu$ from equations 4 and 1 and substituting for $\sigma$ $$\sigma = \tan\theta\,(2r\mu_0/RW]\,\beta P + (1/RW)(dw/dt)) \quad (9)$$

The value for $\sigma$ can be approximated by omitting the second term in the parentheses of equation 9 because it is far smaller than the first term. Thus $$\sigma \approx \tan\theta\,(2r\mu_0/RW)\,\beta P \quad (10)$$

Substituting the equation 10 into equation 8 we obtain the value $$w_2 - w_1 \approx (1 - [\sigma_1 + \sigma_2/2])(v_2 - v_1) - \tan\theta(2r\mu_0/RW)(\beta P_2 - \beta P_1)(v_1 + v_2/2) \quad (11)$$

If the behavior of a wheel is considered over a short period of time, the deceleration $dw/dt$ of the wheel is expressed as follows:

$$dw/dt \approx \lim_{\Delta t \to 0}(w_2 - w_1)/(\Delta t) \quad (12a)$$

Thus $$dw/dt = \lim_{\Delta t \to 0}[(1 - [\sigma_1 + \sigma_2]/2)(v_2 - v_1/\Delta t) - \tan\theta\,(2r\mu_0/RW)\cdot(\beta P_2 - \beta P_1/\Delta t)\cdot(v_1 + v_2/2)] \quad (12)$$

In the above equations $$\lim_{\Delta t \to 0}(\sigma_1 + \sigma_2/2) = \sigma_1,\quad \lim_{\Delta t \to 0}(v_1 + v_2/2) = v_1$$

Thus $$dw/dt \approx (1 - \sigma_1)(dv_1/dt) - \tan\theta\,(2r\mu_0/RW)\cdot(\beta dp/dt)\cdot v_1 \quad (13)$$

The foregoing makes it apparent that the acceleration of the wheel caused when the brake pressure $P_1$ having a pressure change $dP/dt$ is applied to the wheel having a velocity $v_1$ at time $t_1$ is expressed by equation 13. This change occurs regardless of the coefficient of friction between the wheel and ground.

The coefficient of friction $\mu$ is determined by modifying equation 1.

$$\mu = (I/RW)\cdot(dw/dt) + (2r\mu_0/RW)\,\beta P \quad (1)'$$

As mentioned before, the term including the moment of inertia of the wheel is assumed to be far smaller than the term concerning the braking frictional force. Therefore, omitting the first term of equation 1'

$$\mu = 2r\mu_0/RW)\cdot\beta P \quad (1)''$$

If equation 1'' is substituted in equation 2 as well as in equation 5

$$(dv/dt) = g\,(2r\mu_0/RW)\cdot\beta P = -g\,(2/RW)\cdot T \quad (14)$$

It is thus apparent that the vehicle acceleration is proportional to the pressure or braking torque.

The calculations described thus far derive the wheel acceleration. To examine the phenomena occuring during brake application it is necessary to consider the wheel deceleration. If wheel deceleration is defined as $w'$ with its attendant vehicle deceleration and pressure reducing change represented by $v'$ and $P'$ respectively then the relationship between them is as follows:

$$w' = -(dw/dt),$$
$$v' = -(dv/dt),$$
$$p' = -(dP/dt)$$

In the range where the gradient of the $\mu$–$\sigma$ curve is $\tan\theta$ and constant, the value of $\sigma$ in equation 13 is generally small and $$o < \sigma < \sigma_m \ (\sigma_m = 0.05 - 0.15).$$

Assuming that $$1 - \sigma \approx 1, \quad (9b)$$

equation 13 may be rewritten as follows:

$$w' = v' + K\tan\theta\,P'v_1 \quad (15\text{-}1)$$

Where $K$ is constant and equals $$2r\mu_0\beta/RW. \quad (9c)$$

From the above it is evident that the wheel deceleration occurring during optimum braking conditions equals the sum of a term proportional to the vehicle deceleration $v'$ and a term obtained by multiplying the gradient $\tan\theta$ of the $\mu$–$\sigma$ curve by the rate of pressure change of the brake fluid and the vehicle velocity $v$. In effect this shows that optimum skid control depends upon the rate of pressure change, the so-called pressure speed, and the vehicle velocity. From equation 14 it can be seen that the vehicle deceleration is related to the brake pressure and the braking torque. Therefore the equation 15-1 may be rewritten as follows:

$$w' = -gKP + K\tan\theta P' v_1 \tag{15-2}$$

$$w' = -g(2/RW)T + (K/r\mu_0)\tan\theta T' v_1 \tag{15-3}$$

As can be seen, the output of the adder 84 produces a value $w'$ equal to the value in equation 15-2.

As shown in FIG. 6 the control of wheel deceleration is performed on the basis of equation 15-2 as described above. This produces the signal $w'$ corresponding to the vehicle deceleration and the signal corresponding to the product of the gradient $\tan\theta$ of the $\mu$–$\sigma$ curve, braking pressure speed $P'$ and vehicle velocity. The vehicle deceleration may also be expressed in terms of brake pressure and braking torque. The rate of change of pressure, or pressure speed, $P'$ may be expressed as a function of the rate of change of torque $T'$ or torque speed.

The set deceleration of a wheel expressed by the sum of both of these signals is established by the adder 84. Skid control is performed by subtracting the integral of the set deceleration from a wheel speed at the start of the braking action. This subtracted value is then compared with the instantaneous wheel speed.

According to another embodiment of the invention the deceleration detector 6 in FIG. 6 is composed of an accelerometer 6a and a wheel torque or pressure detector 6b. That such a substitution is possible can be seen by considering equation 15-1, 15-2 and 15-3 together. Evidently the first term in equation 15-2 represents the vehicle deceleration. The second term can then be passed to the differentiator 86 either in the form of pressure P or braking torque T as indicated by equation 15-2 or 15-3.

According to another embodiment of the invention the vehicle deceleration detector or decelerometer is in the form of means adapted to detect the braking pressure or braking torque. Thus, provision of an accelerometer is not required since the braking pressure and braking torque correspond to the vehicle deceleration. The rotational speed of the wheel, i.e. the wheel velociry $w$ is always detected by means of the wheel velocity detector 7. Both output signals of the pressure detector 6 and the wheel velocity detector 7 are passed to the control circuit 8 so the latter performs the skid control and passes a skid control signal to the pressure modulator or regulator 9.

In the control circuit 8 of FIG. 6 the signal at the output of amplifier 85 corresponds to the first term $-gKP$ on the right side of equation 15-2. The output of amplifier 88 corresponds to the second term on the right side of equation 15-2. The output of adder 84 corresponds to the right side of equation 15-2.

As is apparent from the theory described hereinbefore, all factors in the kinematic system of the vehicle and wheel being braked are reflected in the set wheel velocity $w_s$. The coefficient of friction of the road surface is also taken into consideration. Therefore, the actual wheel velocity $w$ may be controlled in comparison with the set wheel velocity $w_s$.

Figure 7:
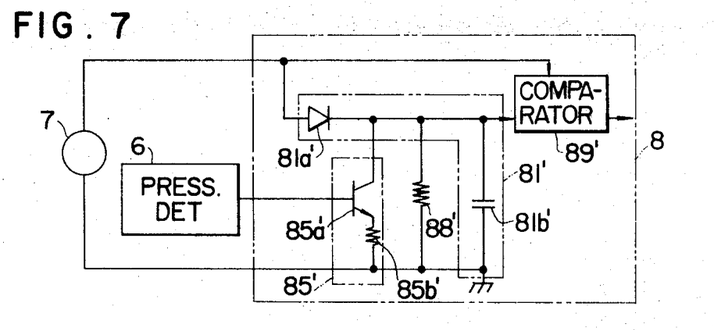
FIG. 7 is a partially schematic, partially block circuit diagram of another embodiment of portions of the system forming a part of FIG. 1.

FIG. 7 illustrates another embodiment of the control circuit 8 in the system of FIG. 1. Here the control circuit is simplified to improve the stability of the control system. In FIG. 6 the wheel deceleration $w'$ depends upon the rate of pressure change or pressure speed $P'$ of the hydraulic pressure $P$. Thus, the pressure speed $P'$ is taken into consideration. As can be seen from FIG. 4 the change in pressure is linear. Thus the pressure speed $P'$ or rate of change of the pressure is constant. Therefore there is no theoretical inconsistency if the pressure speed $P'$ is set at a constant value. For this reason the control circuit 8 of FIG. 7 eliminates the differentiator 86 and the multiplier 87 from its circuit. Here the $\mu$-factor of the linear amplifier 88 is set in accordance with the constant pressure speed $P'$ of the pressure modulator 9.

In FIG. 7 the function of adder 84, subtractor 82, memory 81, and integrator 83 are combined in a capacitor $81b'$ and a diode $81a'$, as well as the connection between the two, in a memory circuit $81'$. The voltage proportional to the wheel velocity $w$, as detected by the wheel velocity detector 7, is applied to one pole of a comparator $89'$. At the same time the voltage proportional to the velocity $w$ is applied to the initial velocity memory circuit $81'$. The pressure detector 6 applies a voltage proportional to the hydraulic pressure $P$ to the base of a transistor $85a'$. The latter forms a linear amplifier $85'$ with a resistor $85b'$. The current $Ia$ corresponding to the first term $a$ on the right side of equation 15-2 is passed to the collector of the transistor $85a'$. The current $I\epsilon$ corresponding to the rate of change $P'$ of pressure $P$ and maintained at a constant value and proportional to the value of velocity $v$ is passed to a resistor $88'$.

In other words, the potential corresponding to the initial velocity $w_0$ charged to the capacitor $81b'$ is decreased by the currents $Ia$ and $I\epsilon$ corresponding to $a$ and $\epsilon$ respectively, thereby to obtain the set wheel velocity $w_s$.

The set wheel velocity $w_s$ is applied to the second terminal of the comparator $89'$ in the reverse polarity with respect to the first pole. Thus current issues from the comparator 89 only when $w$ is lower than $w_s$ and the electromagnetic valve coil of the pressure modulator is excited to decrease the hydraulic pressure.

According to this embodiment of the invention the brake, or braking, pressure speed $P'$ is entered as a constant value. By virtue of this embodiment the circuit for obtaining the differential of the pressure $P$ is eliminated. Of course, it is possible to make the braking torque $T'$ constant as in equation 15-3 instead of the brake pressure speed $P'$.

Figure 8:
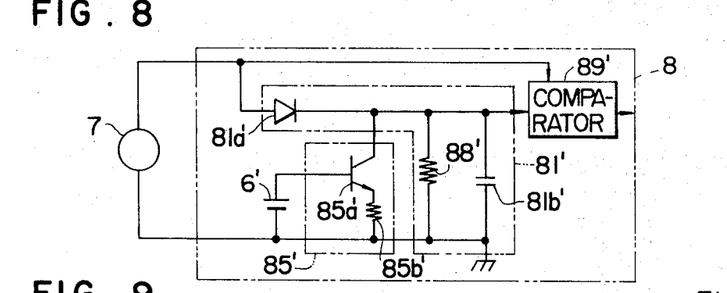
FIG. 8 is a partially schematic partially block diagram of a control circuit forming a part of FIG. 1 and embodying features of the invention.

FIG. 8 illustrates still another, simpler, embodiment of the invention. FIG. 8 differs from FIG. 7 in that the base of transistor $85a'$ is biased by a fixed voltage $6'$. This voltage represents the braking pressure P. The rationale for the structure of FIG. 8 is as follows:

The wheel deceleration $w'$ can be controlled at a constant value if a certain predetermined corrolation is provided between the braking pressure P and the rate at which the brake pressure changes $P'$, and the wheel deceleration $w'$ is determined on the basis of the vehicle velocity $v$. Under these circumstances the braking pressure detector 6 as well as the differentiator for obtaining the pressure applications $P'$ are no longer necessary.

If the vehicle velocity $v$ is assumed to be constant in equation 15-2 the wheel deceleration $w'$ derived by that equation is expressed as the sum of a term a proportional to the braking pressure $P$ and the term $\epsilon'$ proportional to the pressure speed or pressure application speed $P'$. Consequently, if the characteristics of the system, namely the characteristics that regulate the pressure, are such as to make $a + \epsilon'$ constant, the deceleration $w'$ can always be set at a constant value no matter how the slip ratio changes. However, the deceleration $w'$ varies with the vehicle velocity. Consequently, in constructing the circuit of the skid control system so as to ensure substantially optimum skid control, it is necessary to provide a compensating circuit adapted to increase $w'$ when $v$ is high and to decrease $w'$ when $v$ is low.

Assuming $w'$ and $v_2$ to be constant a relationship may be obtained between the braking pressure $P$ and the pressure applications $P'$ from the equation 15-2. Thus $$-gKP + K\tan\theta P' v_1 = w' = Co = \text{constant} \quad (16)$$

This can be rewritten as follows:

$$C_1 P + C_2 P' = C_0$$

Solving this differential equation;

$$C_1 Pt + C_2 P = C_0 t + C_3$$

Arranging the above equation with respect to $P$ and $t$, we obtain;

$$P = [C_0 \, t/C_1 t + C_2] + C_3 \quad (17)$$

where $C_0$, $C_1$, $C_2$ and $C_3$ are all constant. 18a

In other words, for equation 16 to prevail the pressure modulator 9 should exhibit the characteristic in which the hydraulic pressure $P$ and the time $t$ satisfy the equations 17. All constants $C_0$, $C_1$, $C_2$, and $C_3$ are characteristic values which can be obtained from the vehicle being braked.

In FIG. 8 the voltage proportional to the wheel velocity $w$ is applied to one input terminal of a comparator 89' and to the diode 81a' of the initial velocity memory circuit 81'. The latter circuit, in FIG. 8 consists of the diode 81a' and the capacitor 81b'. According to this embodiment of the invention the braking pressure detector 6 is no longer required. The voltage source 6' at the base of transistor 85a' corresponds to the constant $C_0$ in equation 16. The potential biases the base of the transistor 85a' which forms a linear amplifier 85' with the resistor 85b'.

Current corresponding to the constant $C_0$ passes through the collector of transistor 85a'. Since the deceleration $w'$ varies with the change in the vehicle velocity $v$, the resistor 88' is connected to compensate for changes due to vehicle velocity $v$. Thus the potential corresponding to the set wheel velocity $w_s$ obtained from the wheel deceleration $w'$ is applied to the second input terminal of the comparator 89'.

Figure 9:
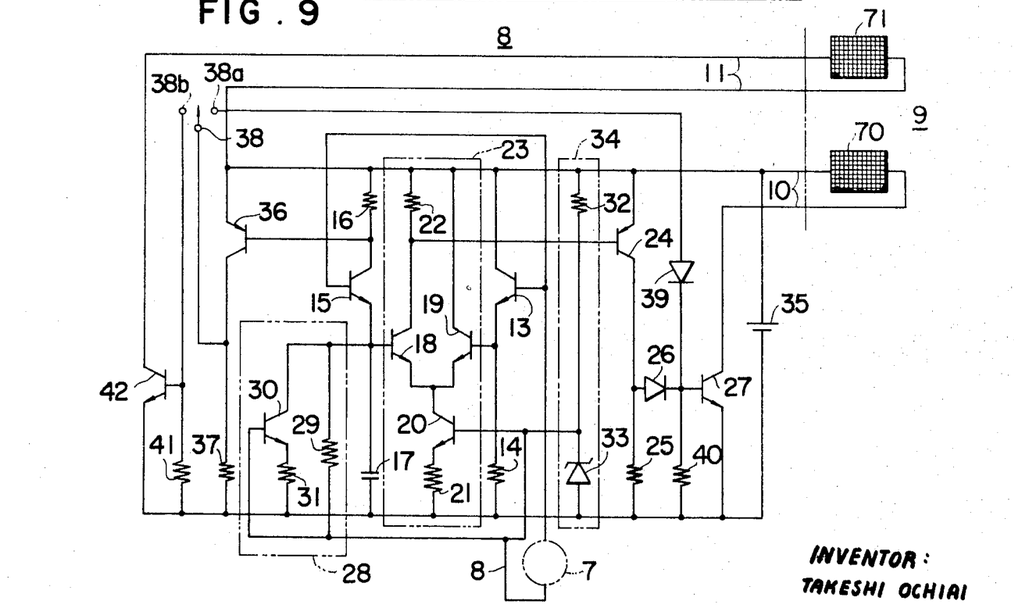
FIG. 9 is a schematic diagram of another embodiment of the control circuit of FIG. 1.

FIG. 9 illustrates a control circuit utilizing the principles of the circuit 8 in FIG. 8. Here the base of a transistor 13 receives the output voltage V from the wheel velocity detector 7. The transistor 13, connected as an emitter follower, produces a voltage $Vw$ proportional to the wheel velocity $w$ across an emitter resistor 14. A second transistor 15 which receives the voltage V from the wheel velocity detector 7 at its base, attempts to charge and discharge an emitter capacitor 17, through its collector resistor 16, to the voltage $Vw$. The voltage $Vw$ ultimately forms the voltage $Vt$ corresponding to the set wheel velocity $w_s$ across the capacitor 17.

Connected to the emitter outputs of transistors 13 and 15 are the bases of two transistors 18 and 19. A transistor 20 and an emitter resistor 21 are connected in series with the emitters of transistors 18 and 19. The transistors 18, 19 and 20 and the resistor 21, 21 and 22 form a differential amplifier 23. Thus the transistor 18 conducts when the voltage $V_t$ stored across the capacitor prevents the voltage at the base of transistor 18 from following the voltage $Vw$ downwardly. An output resistor 22 at the collector of transistor 18 forms a voltage drop when the voltage $Vw$ and the voltage $V_t$ are compared. The transistor 18 may loosely be said to conduct when the transistor 15 conducts heavily and the transistor 19 to conduct with the transistor 13.

A transistor 24 which is rendered conductive by the voltage drop at the collector of transistor 18 connects to the transistor 22. The transistor 24, with its collector resistor 25, generates an output voltage in response to the input voltage from the transistor 18 and applies it through a diode 26 to the base of a transistor 27. The transistor 27 is connected through a pair of lines 10 to the pressure modulator 9 so as to transmit a pressure reducing signal.

The capacitor 17 is connected in parallel with a resistor 29, a transistor 30, and a resistor 31 in a discharge circuit 28 in order to establish the set wheel velocity $w_s$. A constant voltage circuit 34 composed of a resistor 32 and a Zener diode establishes a fixed voltage at the base of transistor 20 in the differential amplifier 23. It also establishes the constant potential at the base of the transistor 30 and one side of the resistor 29 in the discharge circuit 28. This constant potential moreover appears at one terminal of the wheel velocity detector 7.

In order to prolong pressure reduction the emitter base circuit of a transistor 36 receives the voltage appearing across the resistor 16. The transistor 36 forms its output voltage by means of a collector resistor 37. This output voltage appears at a switch 38. A contact 38a of the switch 38 is connected to the transistor 27 as well as to a bias resistor 40 through a diode 39.

Another contact 38b of the switch 38 connects to a resistor 41 and a transistor 42. The transistor 42 is connected to the pressure modulator 9 through the lines 11. This signal is applied to the electric lines 11 only when the contact 38b is connected to the armature of the switch 38. The circuit of FIG. 9 is actuated electrically by a switch interlocked with the engine switch, a switch actuated by the brake pedal, or the like.

Figures 10, 11A:
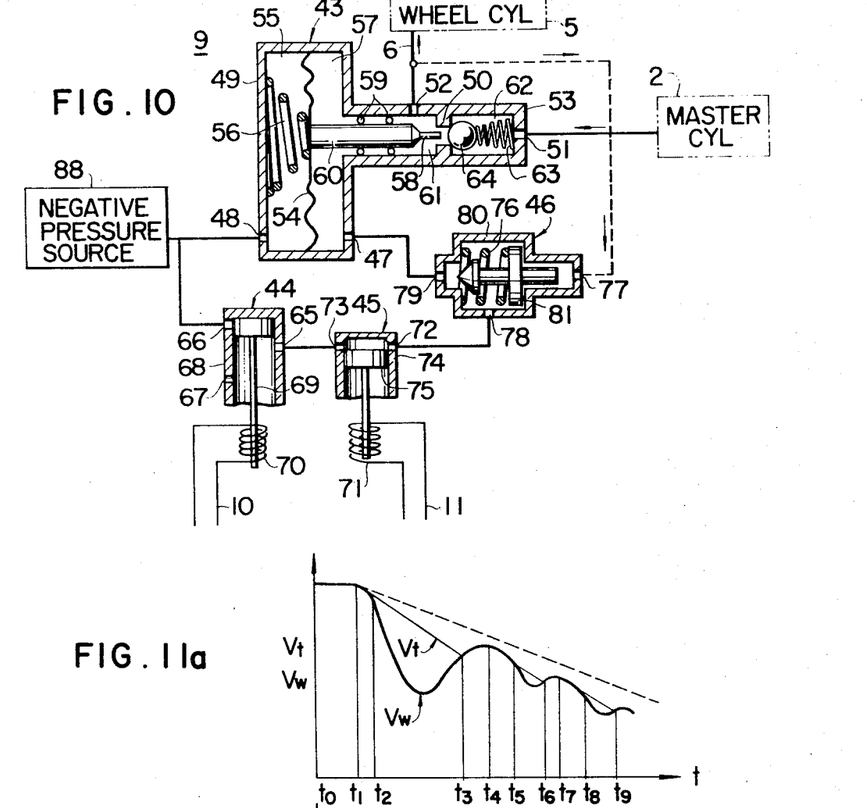
FIG. 10 is a hydraulic circuit diagram illustrating an embodiment of the regulator shown in FIG. 1.
FIG. 11a is a graph illustrating variations with respect to time of voltages proportional to the actual wheel velocity and the set wheel velocity for various conditions in FIGS. 1, 9 and 10.

The circuit 8 of FIG. 9 actuates the pressure regulator or modulator 9 illustrated in FIG. 10. Here a pressure modulating unit 43 reduces the brake pressure of the wheel cylinder 5. A changeover valve 44 is actuated by means of the pressure reducing signal transmitted through the electric lines 10 from the control circuit 8. A retaining valve 45 is operated by signals transmitted over electric lines 11. A pressure regulating valve 46 controls the operation of the pressure modulating unit 43 on the basis of signals received from the control circuit 8 and the brake pressure.

The pressure modulating unit 43 is composed of a large-diameter cylinder body 49 having ports 47 and 48 located opposite to each other, and a small-diameter cylinder body 53 having a narrowed portion 50 as well as ports 51 and 52. A diaphragm 54 in the large-diameter cylinder body 49 divides the interior thereof to form a negative pressure chamber 55 having a spring 56 on one side and an operating chamber 57 on the other side. Projecting from the center of the diaphragm 54 is a piston 60. The piston 60 extends through a seal 59 and terminates in a narrow end 58 that projects into the small-diameter cylinder body. Within the small-diameter cylinder body 53, the narrowed portion 50 and the seal 59 form a modulating chamber. At the other side of the narrowed portion 50 the body 53 forms an introduction chamber 62 wherein a spring 63 pushes a check ball 64 against the opening formed by the narrowed portion 50.

In the changeover valve 44 a valve body 69 travels along a cylinder body 68 having a port 65 and two other ports 66 and 67 which are changed over. When the control circuit issues a pressure reducing signal through the wires 10, the electromagnetic coil 70 excites the valve body 69. This moves the valve body to its uppermost position where it blocks the port 66 and brings the port 65 into communication with the port 67. When no signal is transmitted and the valve body 69 is deenergized, the latter travels into its lower position and the port 65 communicates with the port 66.

In the retaining valve 45 a valve body 75 slides within a cylinder body 74 having ports 72 and 73 located at opposite sides thereof. When the control circuit 8 issues a signal to the wires 11 the electromagnetic coil 71 moves the valve body 75 into its uppermost position. This closes the port 72.

In the pressure speed regulating valve 46 a throttle valve 81 slides within a body 80 having ports 77, 78 and 79 on three sides thereof. A spring biases the valve 81 in one direction.

Hydraulic lines connect the port 51 of the pressure modulating unit 43 to the master cylinder 2, and the port 52 of the unit 53 to the wheel cylinder 5 as well as to the port 77 of the pressure speed regulating valve. The port 48 of the pressure regulating unit 43 is connected to a negative pressure source 82 and the port 66 of the changeover valve 44. The port 67 of the changeover valve 44 opens to the atmosphere. The port 65 connects to the port 47 of the pressure modulating unit through two ports 72 and 73 of the retaining valve 46 and two ports 78 and 79 of the pressure speed regulating valve.

Figure 11B:
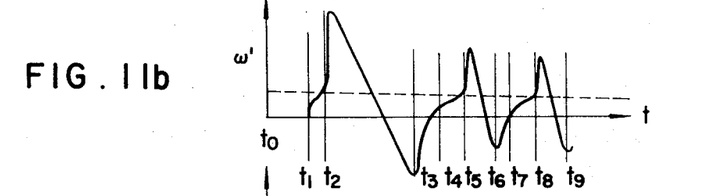
Figure 11C:
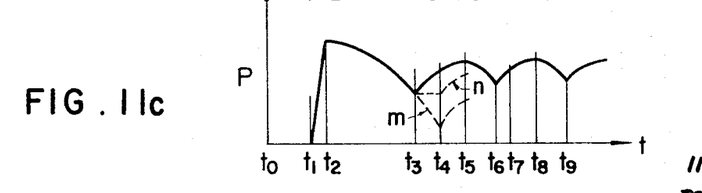
FIG. 11c is a graph illustrating the variation in fluid pressures at the wheel cylinder of FIG. 1 for the condition shown in FIGS. 11a and 11b.

The operation of FIGS. 1, 9 and 10 can best be understood by referring to FIGS. 11a, 11b and 11c. When a vehicle travels normally such as during the times from $t_0$ to $t_1$ in FIGS. 11a, 11b and 11c the wheel velocity is equal to the vehicle velocity and almost constant. At this time the capacitor 17 of the differential amplifier 23 in the control circuit 8 is charged and the voltage $V_t$ becomes equal to the voltage $V_w$ representing the wheel velocity. The transistors 15, 18, 24 and 27 are then all non-conductive. Therefore no pressure reducing signal is issued. Consequently the electromagnetic coil 70 of the changeover valve 33 in the pressure modulator 9 is deenergized. The port 65 then communicates with the port 66. Because the retaining valve 45 is not operated the port 72 communicates with the port 73. Since no braking pressure exists in the pressure speed regulating valve 46 the valve body 81 is retracted or biased by the spring 76 to the rearmost position so as to open port 79. Therefore, the chambers 55 and 57 located on opposite sides of the diagragm 54 in the pressure modulating unit 43 exhibit the same negative pressure. The spring 56 thus pushes the diaphragm 54 to the right. The end portion 58 of the piston 60 moves the check ball 64 to the right against the pressure of the spring 63. This brings the introduction chamber 62 into communication with the modulating chamber 61. Thus, the master cylinder 2 communicates with the wheel cylinder 5 to perform the normal braking operation.

When the emergency brake is applied at time $t_1$ while traveling under the above described conditions and the braking pressure is increased linearly as shown in FIG. 11c to decelerate the wheel velocity, the voltage $V_t$ across the capacitor 17 and the control circuit 8 is discharged by the transistor 30 and the resistor 29 of the discharge circuit 28. The rate of discharge is in accordance with the decrease in the voltage $V_w$ representing the wheel velocity. This causes a decrease in voltage across the capacitor. However, during the initial braking period from time $t_1$ to times $t_2$ the wheel deceleration is comparatively small. It is smaller than the drop rate due to the discharge of the voltage Vt on capacitor 17. Thus, both voltages Vw and Vt drop to an equal value. The transistors 15, 18, 24 and 27 then remain non-conductive and no pressure reducing signal is issued. Consequently, the pressure regulator or modulator 9 remains in the same condition as it was during the normal movement of the vehicle. At the time $t_2$, the coefficient of friction between the wheel and the road surface approaches a maximum. The slip ratio is suddenly increased and the wheel velocity decreases rapidly. In this case the wheel deceleration suddenly increases as shown in FIG. 11b. In the control circuit 8 the voltage drop rate of the voltage Vw due to the wheel deceleration becomes larger than the voltage drop rate of voltage Vt due to the discharge of the set deceleration. Thus the transistor 15 becomes completely non-conductive. The voltage Vt at the base of transistor 18 now exceeds the voltage Vw at the base of the transistor 19. The transistors 18, 24 and 27 conduct. This generates an output voltage. The voltage is applied as a pressure reducing signal to the electromagnetic coil 70 of the changeover valve 44 of the pressure modulator 9.

In the pressure modulator 9 of the electromagnetic coil 70 of the changeover valve 44 moves the valve body 69 to bring the port 67 into communication with the port 65. Thus the operating chamber 57 of the pressure modulating unit 43 is exposed to atmospheric pressure. This moves the diaphragm 54 to the left against the force of the spring 56. The diaphragm 54 carries the piston 60 to the left. The spring 63 now presses the check ball 64 to close the opening at the narrowed portion 50. This interrupts communication between the chambers 61 and 62. The hydraulic pressure line 6 between the master cylinder 2 and the wheel cylinder 5 is thus interrupted. As a result of the above the volume of the modulating chamber 61 is increased due to the movement of the piston 60 to the left. The braking pressure of the wheel cylinder 5 is decreased because of reduced pressure and its own characteristic, as shown in FIG. 11c.

At this time the valve body 81 of the pressure speed regulating valve 46 is moved by the braking pressure applied to the port 77 to change the opening area of the port 79 and regulate the flow rate of atmospheric pressure by throttling. When the braking pressure is low at the initial period of braking the braking pressure changing speed is increased by increasing the flow of atmospheric pressure and consequently the volume of the modulating chamber 61 of the pressure modulating unit 43. As the braking pressure is increased the braking pressure changing speed is decreased by decreasing the flow of atmospheric pressure and consequently the volume of the modulating chamber 61.

As described above, skid control is performed at the time $t_2$. The wheel velocity is increased again to approach the vehicle velocity. Consequently the voltage Vw corresponding to the wheel velocity is increased. At the time $t_2$ the voltage exceeds the voltage Vt developed by the capacitor 17 so as to correspond to the set deceleration. Thus, the transistors 18, 24 and 27 of the control circuit 8 are rendered non-conductive at the time $t_3$. This eliminates the pressure reducing signal being passed to the pressure modulator 9. At the same time the transistor 15 is rendered conductive to charge the capacitor 17. Consequently, the electromagnetic coil 70 of the changeover valve 44 in the pressure modulator is deenergized and the valve body 69 moved to bring the port 66 into communication with the port 65. Thus negative pressure is introduced into the operating chamber 57 of the pressure modulating unit 43 and the piston 60 is moved to the right by means of the spring 56.

At this time the braking pressure is applied to the port 77 of the pressure speed regulating valve to move the valve body 81 forward, and thereby to throttle the port 79. Consequently the negative pressure in the operating chamber of the pressure modulating unit 43 is low, and therefore the movement of the piston is not large enough to project the check ball 64 to establish communication between the chambers 61 and 62. Thus the volume of the chamber 61 is decreased. Therefore the braking pressure of the wheel cylinder 5 is increased in accordance with the decrease in the volume. This is shown in FIG. 11c. It performs the same operation as is the case when the pressure application signal is applied.

The wheel velocity being restored to perform braking at the time $t_3$ reaches a maximum at the time $t_4$ and then decreases again. From the time $t_4$ on the voltage Vw corresponding to the wheel velocity becomes equal to the voltage Vt corresponding to the set velocity in the same manner as they were during the period from $t_1$ to $t_2$. At the time $t_5$ the coefficient of friction approaches a maximum as it did at the times $t_2$ and the pressure reducing signal issues from the control circuit 8 and the wheel deceleration is suddenly decreased as shown in FIG. 11b. Thus skid control is performed by means of the pressure modulator 9.

The above described operations are continuously repeated several times from the time $t_6$ on so as to perform optimum braking.

In the above described braking process the switch 38 in the control circuit 8 may be placed against the contact 38a to cause the transistor 36 to conduct during the periods of time from $t_3$ to $t_4$ and from $t_6$ to $t_7$ when the wheel velocity is being increased and when the capacitor 17 is being charged. Then, even if the transistor 24 is rendered non-conductive signals through the diode 39 render the transistor 27 conductive. The latter then continues to apply pressure reducing signals to the pressure modulator 9. Thus the pressure reducing time is prolonged as shown by the broken line in FIG. 11c. This further accelerates the recovery of the wheel velocity.

In order to obtain the same effect as described above, the switch 38 of the control circuit 8 is switched to close against the contact 38b. This renders the transistor 42 conductive during the same time intervals as described above. This causes issuance of pressure reducing signals through the lines 11 to the pressure modulator 9. Consequently the electro-magnetic coil 71 of the retaining valve 45 in the pressure modulator is excited and the port 72 closed by the movement of the valve body 75. Thus the atmospheric pressure is supplied to the operating chamber 57 of the pressure modulating unit 43 during the time period of $t_3$ to $t_4$. The pressure of the braking fluid is maintained constant during this period of time as shown by the alternate long and short line in FIG. 11c.

According to another embodiment of the invention the system of FIGS. 9 and 10 are modified to include the inputs illustrated in FIGS. 6 and 7.

As described so far, according to this invention, the wheel deceleration is established from the vehicle deceleration, the vehicle velocity, the rate at which the braking fluid pressure is changed in the gradient of the characteristic curve shown in the relationship between the coefficient of friction and the road surface and the wheel slip ratio. Skid control is performed by comparing the set wheel velocity obtained in accordance with the set deceleration and the actual wheel velocity. Consequently, compared with systems in which a chosen value is arbitrarily adopted as the set deceleration, the skid control system embodying features of this invention performs skid control optimally in accordance with the changes and the kind of road surface, vehicle velocity, and slip ratio.

Skid control systems embodying features of this invention may include a mechanical, hydraulic, or pneumatic arrangement instead of the electronic circuit employed in the above-described embodiment. Where a mechanical element is employed, for example, the capacitor 17 of the control circuit 8 may be replaced with a flywheel. The discharging resistor 30 may be replaced with a friction brake adapted to decelerate the flywheel. The charging resistor 15 would then be replaced by a one-way clutch adapted to accelerate the flywheel. The differential amplifier would be composed of a governor mechanism etc.

It should be noted that in FIG. 6 the memory 81 can be composed of a capacitor being charged through a diode. The subtractor circuit 82 may be composed of an inverter and an adder.

In FIG. 9 the combination of the transistor 30 with its resistor 31 and the resistor 29 operate similar to the transistor 85a', the resistor 85b' and the resistor 88. In effect the transistor 15 charges the capacitor 17 to a voltage Vt corresponding to the voltage Vw. At the same time the transistor 30 and its resistor 31 discharge the capacitor 17 at a constant rate. Simultaneously the resistor 29 discharges the capacitor 17 along the normal exponential discharge path. The combined discharge rate is the sum of the linear and exponential rates. As long as the velocity is constant these rates correspond to a value proportional to the brake fluid pressure and a value proportional to the rate of change of the pressure. As long as the velocity is constant the transistor 15 keeps recharging the capacitor 17 despite the discharging effect of the parallel circuit composed of transistor 30 with its resistor 31 and the resistor 29.

The circuit 28 discharges the capacitor at the above rate. As long the voltage applied to the bases of transistors 15 and 13 declines at a slower rate the transistor 15 will tend to keep charging the capacitor 17 so that the voltage at the base of transistor 18 follows the voltage at the base of the transistor 19. However, where the voltage V at the output of the detector 7 declines at a rate so that the voltage at the bases of transistors 18 and 19 try to go down faster than the discharge rate of the circuit 28, the capacitor 17 will not follow and will force the base of the transistor 18 to remain higher than the base of the transistor 19. This renders transistors 18, 24 and 27 conductive.

In FIG. 10 it should be noted that the negative feedback produced by the connection from the port 52 to the port 77, and the operation of the valve 46 constrains the entire system to operate according to equation 17. In this way the skid control system of FIGS. 19 and 10 operate on the basis of equation 16 and equation 15-2.

As is apparent form the equations 1 to 15-3 all factors in the kinematic system of the vehicle and wheel being braked are reflected in the set wheel velocity $w_s$. The coefficient of friction of a road surface is also taken into consideration. Therefore, the actual wheel velocity $w$ is controlled in comparison with the set wheel velocity $w_s$.

The invention has three aspects. According to the first aspect of the invention the control of the wheel deceleration is performed according to the equations 15-1, 15-2 and 15-3. Therefore, the signal corresponding to the vehicle deceleration, which may be expressed by the braking pressure or braking torque, and the signal corresponding to the product of the gradient $\tan\theta$ of the $\mu$-$\sigma$ curve, braking pressure speed P' (or torque changing speed T') and the vehicle velocity are produced. The set deceleration of a wheel expressed by the sum of both signals is obtained. Thus skid control is performed by the comparison of the thus obtained set wheel deceleration and the actually detected wheel deceleration.

According to another aspect of the invention, the braking pressure speed P' is selected as a constant value. By virtue of this construction a circuit for obtaining the braking pressure speed P' can be eliminated. Of course it is possible to make the braking torque $T_2'$ constant instead of the braking pressure speed P'.

According to still another aspect of this invention, a specific predetermined corrolation is provided between the braking pressure P and the braking pressure speed P'. Thus the wheel deceleration to be calculated by taking into consideration the signal corresponding to the vehicle velocity can be made substantially constant for various conditions of road surface. In this case the detection of the braking pressure is no longer required, because a predetermined corrolation is produced between P and P'. This greatly simplifies construction of the apparatus.

While embodiments of the invention have been described in detail it will be obvious to those skilled in the art that the invention may be embodied otherwise without departing from its spirit and scope.

What is claimed is:

1. An apparatus for determining whether the force supplied by the brakes of a vehicle to its wheels is too high, comprising detecting means for detecting the velocity of the wheel, memory means responsive to said detecting means for establishing a value corresponding to the velocity of the wheel, sensing means coupled to said memory means for exhibiting a value dependent upon the value in said memory means, control means capable of changing the value exhibited by said sensing means linearly and exponentially for modifying the value exhibited by said sensing means linearly and exponentially, said control means including first and second portions respectively modifying the exhibited value linearly and exponentially, and comparator means coupled to said sensing means and said detecting means for comparing the value exhibited at said sensing means with the value of said detecting means for producing an output signal when the value of said sensing means exceeds a predetermined relationship between the values of said sensing means and said detecting means.

2. An apparatus as in claim 1, wherein said portions are connected in parallel to each other.

3. An apparatus for determining whether the force applied by the brakes of a vehicle to its wheels is too high, comprising memory means for establishing a value corresponding to the velocity of the wheel, first control means capable of changing the value in said memory means linearly, second control means capable of changing the value in said memory means exponentially, adding means for connecting said first and second control means to said memory means so as to change the value in said memory means on the basis of the sum of the linear and exponential change, and comparator means connected to said adding means for comparing the value in said memory means with an input value corresponding to the velocity of the wheel and for producing an output signal when the value in said memory means exceeds the input value corresponding to the velocity of the wheel.

4. An apparatus as in claim 3, wherein said memory means includes energy storage means.

5. An apparatus as in claim 3, wherein said memory means includes capacitor means and unidirectional means for applying a voltage corresponding to the wheel velocity across said capacitor means.

6. An apparatus as in claim 5, wherein said first control means includes linear amplifying means for forming a path of constant current flow.

7. An apparatus as in claim 5, wherein said second control means includes a resistor.

8. An apparatus as in claim 5, wherein said adding means includes a circuit connecting each of said control means in parallel across said capacitor means.

9. An apparatus as in claim 8, wherein said first control means includes linear amplifying means for forming a path of constant current flow.

10. An apparatus as in claim 9, wherein said second control means includes a resistor.

11. An apparatus as in claim 10, wherein said first control means includes linear amplifying means for forming a path of constant current flow.

12. An apparatus as in claim 11, wherein said comparator means includes a differential amplifier.

13. An apparatus as in claim 12, further comprising pressure modulating means for modulating the braking force applied to the wheel.

14. A skid control system for a vehicle having a wheel and brakes for applying a braking force to the wheel, comprising a wheel velocity detector for detecing the velocity of the wheel, an initial velocity memory circuit for memorizing the wheel velocity when a braking force is applied to the wheel, first detector means for obtaining an output corresponding to the vehicle deceleration, second detector means for obtaining an output corresponding to the braking force applied to the wheel, differentiator means coupled to said second detector means to differentiate the output of said second detector means, multiplier means connected to said differentiator means for producing an output proportional to the product of the output of said differentiator means and the velocity of the vehicle and the product of the gradient of the characteristic curve determined by the coefficient of friction between a road surface and a wheel and a wheel slip ratio in the range of slip ratios less than that at which the characteristic curve is curved, adder means coupled to said first detector means and said multiplier means for adding the outputs of said first detector means and said multiplier means to obtain a value corresponding to a safe wheel deceleration, integrator means coupled to said adder means for integrating the value corresponding to the safe deceleration, subtractor means coupled to said memory means and said integrator means for subtracting the time integration of the value corresponding to the safe deceleration from the output of said wheel velocity detector, comparator means coupled to said velocity detector and said subtracting means for producing a pressure reducing signal when the output of said subtracting means exceeds the output of said detector, and pressure modulator means responsive to said comparator means for regulating the braking force in accordance with an output signal from said comparator means.

15. A skid control system as in claim 14, wherein said multiplier means responds to the output of said subtracting means for responding to a value corresponding to the vehicle velocity.

16. A skid control system for a vehicle having a wheel and a brake for applying a braking force to the wheel, comprising a wheel velocity detector means for detecting the wheel velocity, initial velocity memory circuit means for memorizing the wheel velocity at the initiation of braking, braking force detector means for producing an output proportional to the vehicle deceleration, braking force speed means for producing an output corresponding to the rate of change of the braking force, multiplier means coupled to said braking force speed means for producing a signal corresponding to the product of the vehicle velocity and the output of said braking force speed means as well as the gradient of the characteristic curve determined by the coefficient of friction between a road surface and a wheel and the wheel slip ratio in the range of slip ratios less than that at which said characteristic curve is curved, adder means coupled to said multiplier means for adding both outputs of said braking force detecotr means and said multiplier means for obtaining a value corresponding to a set deceleration, integrator means coupled to said adder means for producing a value corresponding to the integral of the set wheel acceleration, subtractor means connected to said memory circuit means and said integrator means for producing a signal corresponding to the difference between the output of said memory means and the output of said integrator means, comparator means coupled to said subtractor means and said detector means for producing a braking force reducing signal when the output of said subtractor means exceeds the output of said detector means, and force modulator means coupled to said comparator means for regulating the braking force with a constant force application rate of change in accordance with the output signal of said comparator means.

17. A system as in claim 16, wherein the output of said subtractor means is coupled to said multiplier means.

18. A skid control system for a vehicle having a brake arrangement for applying a braking pressure to a wheel of the vehicle, comprising wheel velocity detector means for detecting the velocity of the wheel, initial velocity memory means for memorizing the wheel velocity at the time of the start of a braking action, subtractor means responsive to said memory means for obtaining a set wheel velocity by substracting a time integration of a set deceleration from an initial velocity, braking pressure sensing means for detecting the braking pressure, linear amplifier means coupled to the output of said subtractor means and to said sensing means for amplifying the set wheel velocity to obtain an output substantially corresponding to the product of the vehicle velocity and the rate of change of the braking pressure as well as the gradient of the characteristic curve determined by the coefficient of friction between a road surface and a wheel and the wheel slip ratio in the range of slip ratios less than that at which the characteristic curve is curved, comparator means for comparing the wheel velocity and the set wheel velocity for issuing a braking pressure reducing signal when the wheel velocity is less than the set wheel velocity, and pressure modulator means for reducing the braking pressure in accordance with said signal by providing the characteristic to the pressure modulating speed so that the sum of the value representing the braking pressure and the value representing the change in braking pressure become constant.

19. A skid control system for varying the braking pressure applied by a brake to the wheel of a vehicle, comprising velocity measuring means for measuring the velocity of the wheel, storage means for storing a value corresponding to the output of said measuring means, first control means capable of changing the level of the value in said storage means linearly, second control means capable of changing the level of the value in said storage means exponentially, adding means for connecting said first and second control means to said storage means so as to change the value in said storage means on the basis of the sum of the linear and exponential change, comparator means responsive to said adding means and said measuring means for comparing the value in said adding means and said measuring means and producing an output signal when the value in said storage means exceeds the value in said measuring means, and braking force modulating means responsive to said comparator means for regulating the braking force applied by the brake to the wheel.

20. A system as in claim 19 wherein said braking force modulating means includes a negative feedback system for delaying the effect said modulating means has upon the braking force in response to said comparator means.

21. A system as in claim 20 wherein said braking force modulating means has a characteristic obeying the expression $(C_0 t/c_1 t + C_2) + C_3$, where t represents time and $C_0$, $C_1$, $C_2$ and $C_3$ are constants.

22. A system as in claim 20 wherein said first control means includes linear aplifying means for forming a path of constant current flow and wherein said second control means includes a resistor.

23. A system as in claim 22 wherein said braking force modulating means includes a pressure control system, said pressure control system having an output, said pressure control system having an input, said pressure control system having a throttling valve responsive to said output and forming a feedback in said system.

24. A system as in claim 19 wherein said storage means includes capacitor means and unidirectional means for applying a voltage corresponding to the wheel velocity across said capacitor means.

25. A system as in claim 24 wherein said first control means includes linear amplifying means for forming a path of constant current flow.

26. A system as in claim 24 wherein said second control means includes a resistor.

27. A system as in claim 24 wherein said adding means includes a circuit connecting each of said control means in parallel across said capacitor means.

28. A system as in claim 27 wherein said first control means includes linear amplifying means for forming a path of constant current flow and wherein said second control means includes a resistor.

29. A system as in claim 19, wherein said control means include means for prolonging the modulaton of said braking force when the value in said storage means no longer exceeds the value in said measuring means.

* * * * *